United States Patent [19]

Jan

[11] Patent Number: 5,205,066
[45] Date of Patent: Apr. 27, 1993

[54] MOLE CHASER

[76] Inventor: Te Chin Jan, 6Fl, No. 15, Lane 174, Hsin Ming RD., Taipei, Taiwan

[21] Appl. No.: 954,868

[22] Filed: Sep. 30, 1992

[51] Int. Cl.$^5$ .............................................. A01M 1/20
[52] U.S. Cl. ..................................... 43/124; 116/22 A; 367/139; 340/384 E
[58] Field of Search ................... 43/124; 367/139; 116/22 A; 340/384 E

[56] References Cited

U.S. PATENT DOCUMENTS

| | | |
|---|---|---|
| 3,093,761 | 6/1963 | Case .................................... 116/22 A |
| 3,503,039 | 3/1970 | Aniskovicz ............................ 43/124 |
| 4,097,838 | 6/1978 | Fiala ..................................... 367/139 |
| 4,163,966 | 8/1979 | Mounce ................................. 43/124 |
| 4,215,429 | 7/1980 | Riach .................................... 367/139 |
| 4,366,562 | 12/1982 | McGinty ............................. 43/124 |
| 4,484,315 | 11/1984 | Hall ....................................... 43/124 |
| 4,870,779 | 10/1989 | Johnson ................................ 43/124 |

Primary Examiner—Kurt C. Rowan
Attorney, Agent, or Firm—W. Wayne Liauh

[57] ABSTRACT

A mole chaser, which comprises a main stem, a cap, a battery chamber, and an audio frequency circuit; the main stem and the cap are fastened together with threads, whereby battery chamber and the audio frequency circuit can be sealed in the main stem. The lower end of the main stem has a point end to facilitate the main stem to be planted in ground. The audio vibration signal is to be sent out through the main stem to chase moles. Through the special design of the battery chamber, the whole chaser becomes simple in structure, such as the battery chamber can be pulled out easily for replacing battery, and the main stem can be closed and sealed with the cap to become waterproof.

1 Claim, 5 Drawing Sheets

MOLE CHASER

BACKGROUND OF THE INVENTION

FIG. 1 is a perspective view of a conventional mole chaser, in which the stem "A" is to be planted in ground. The top end of the stem is mounted with a battery chamber "B" to provide an audio frequency circuit (not shown) therein with electric power so as to generate an audio vibration signal to chase away moles or the like; however, the aforesaid chaser has a complex structure, such as the battery chamber "B" being too large, and being not water proof.

SUMMARY OF THE INVENTION

This invention relates to an improved mole chaser, which comprises a main stem, a cap, a battery chamber, and an audio frequency circuit. The main stem and the cap are to be fastened together chamber and the audio frequency circuit tightly sealed in the main steam. The point end of the main stem facilitates the chaser to plant in ground. The audio vibration signal can be sent out through the main stem to chase moles away. The prime feature of the present invention is to provide a pulling-out type of battery chamber to facilitate replacement of battery.

Another feature of the present invention is to provide a simple mole chaser, of which the battery chamber is installed in the main stem to make the structure thereof simple. Still another feature of the present invention is to provide a water-proof mole chaser, of which the main stem and the cap are fastened together in a water tight and sealed manner.

DETAILED DESCRIPTION

Figure 1:
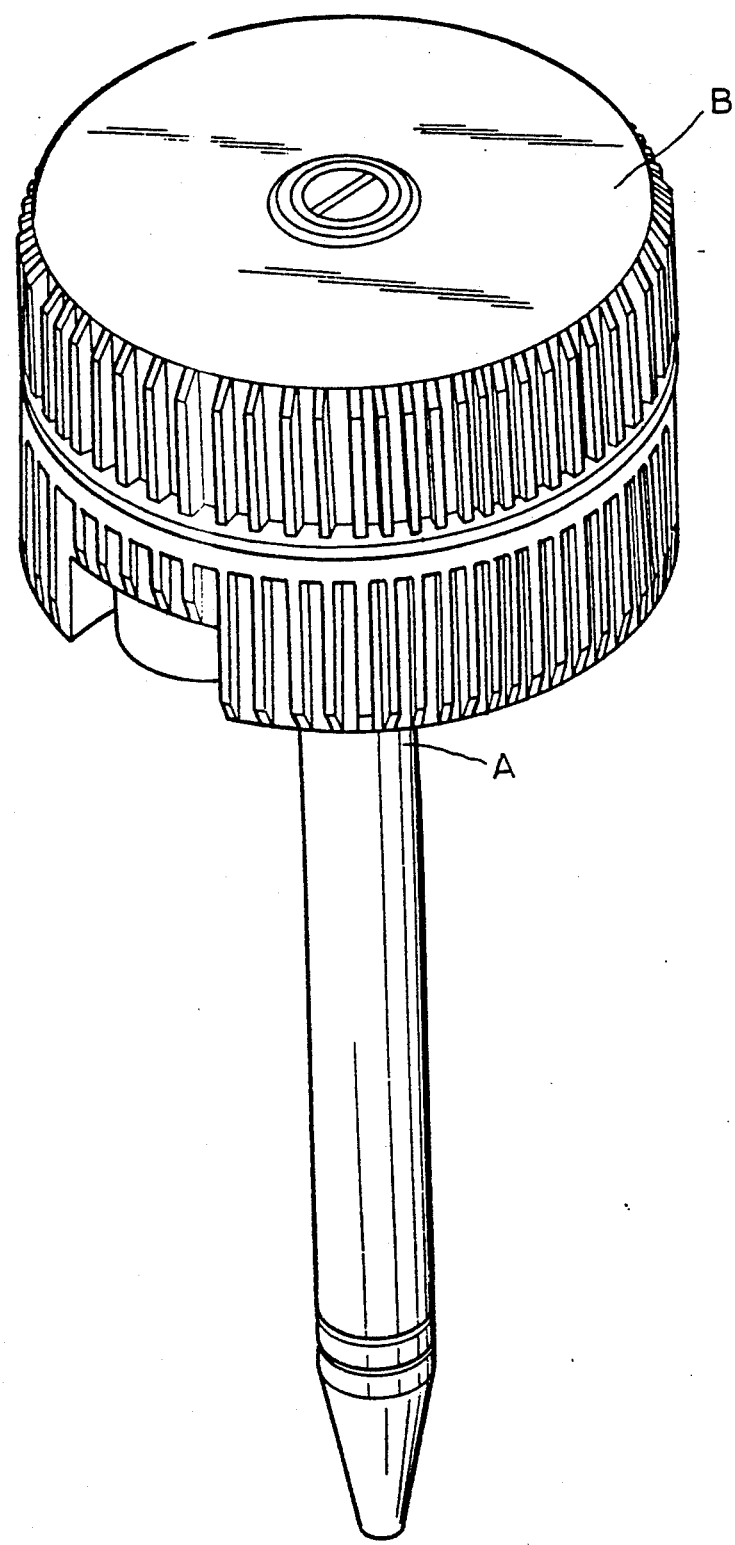
FIG. 1 is a perspective view of a conventional mole chaser.
Figure 2:
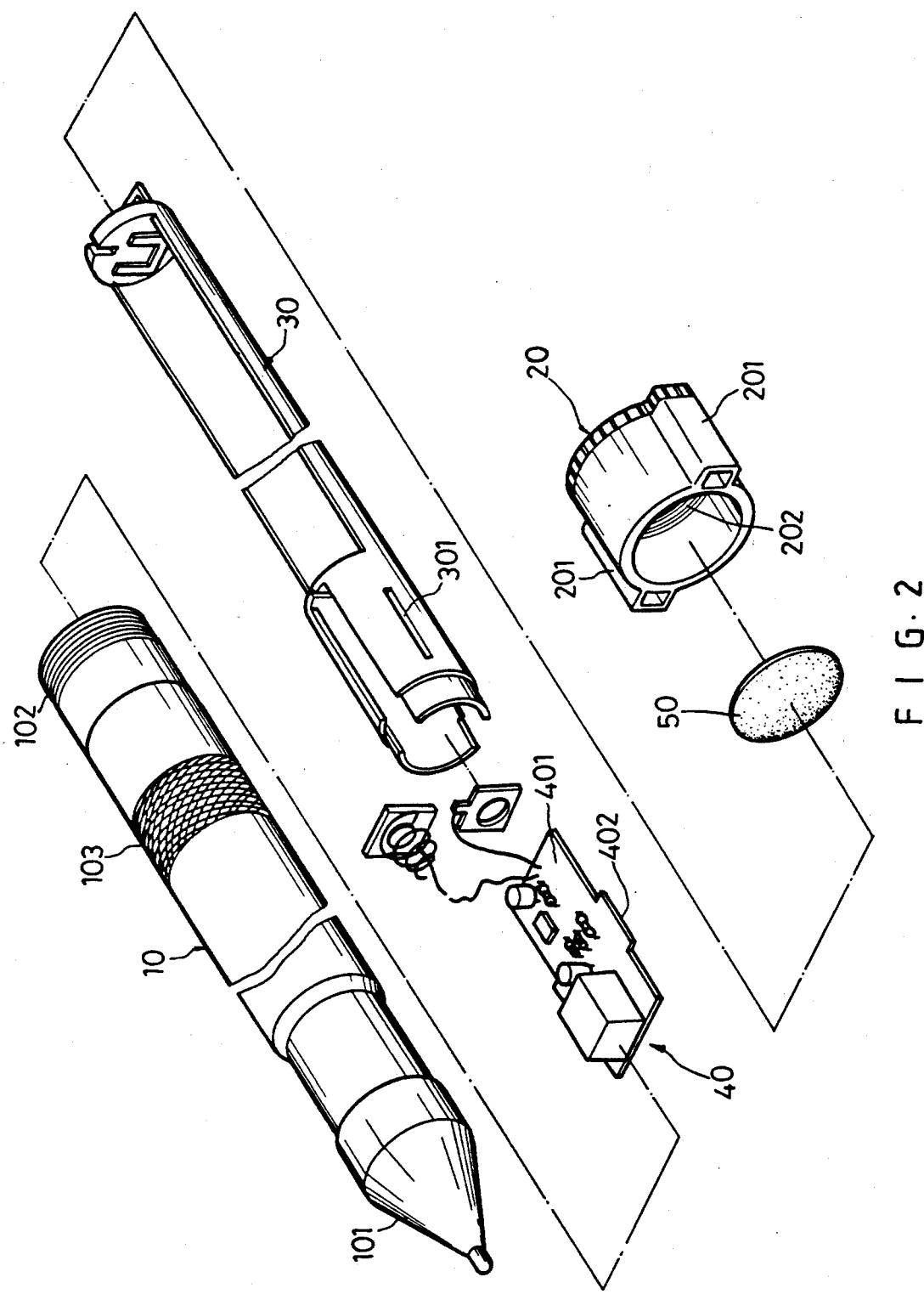
FIG. 2 is a disassembled view of a mole chaser according to the present invention.
Figure 3:
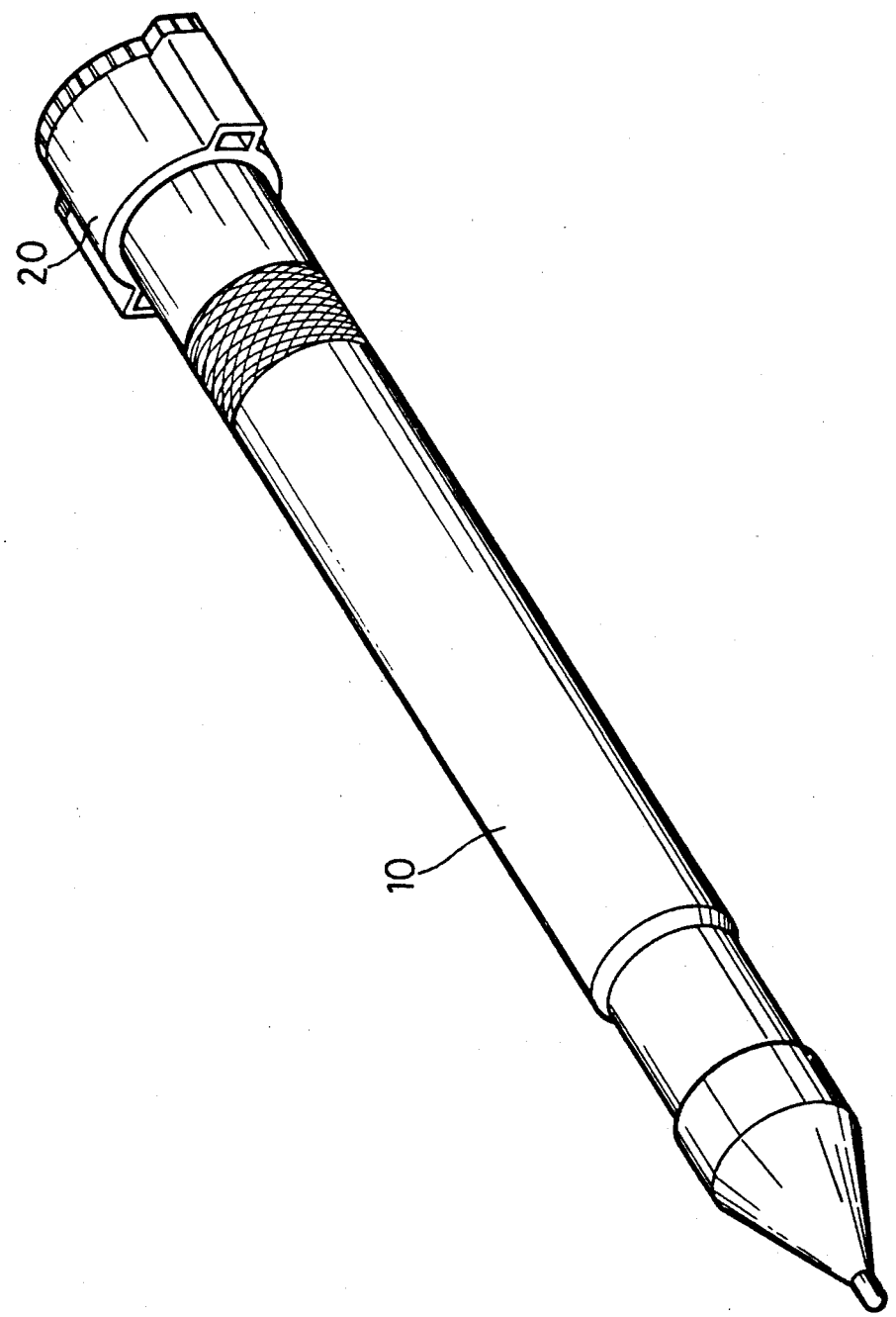
FIG. 3 is a perspective view of the present invention.
Figure 4:
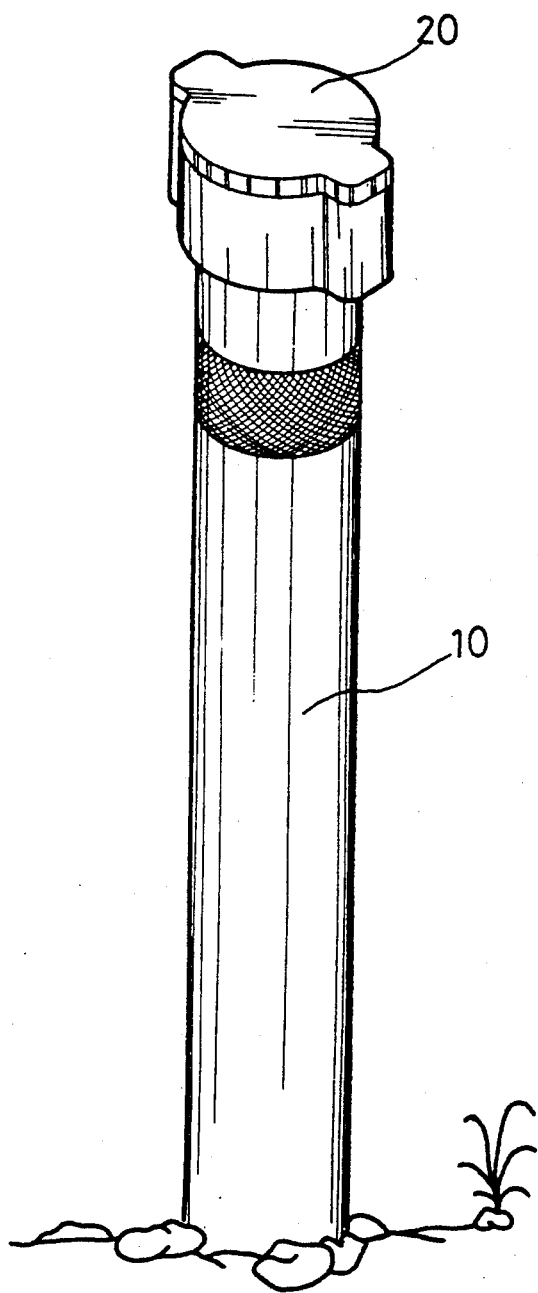
FIG. 4 illustrates the present invention being planted in ground.

Referring to FIGS. 2 and 3, the embodiment of the present invention comprises a main stem 10, a cap 20, a battery chamber 30 and an audio frequency circuit 40. The main stem 10 is a hollow pipe with a point end 101 to be plugged in ground easily (as shown in FIG. 4); the other end of the main stem is furnished outer threads 102 and a granular surface 103 to facilitate gripping. The present invention also comprises a cap 20 with two lugs 201 on both sides thereof and inner threads 202 therein, and an audio frequency circuit 40 on a circuit board 401 which two flanges 402, whereby the circuit board is retained in two slots 301 in the battery chamber 30. The main steam 10 is used for accommodating the battery chamber 30 and the audio frequency circuit 40 therein. The main stem 10 can be closed with a washer 30 and a cap 20 by means of the inner threads 202 therein and the outer threads 102 in the steam 10; the washer 50 is used for water tight function. By means of the simple structure of the main stem 10 and the cap 20, the main stem can be closed with the outer threads 202 and the inner threads 202 thereof to provide a water tight function; further, a pulling-out type of battery chamber 30 can facilitate a quick replacement of battery therein.

Figure 5:
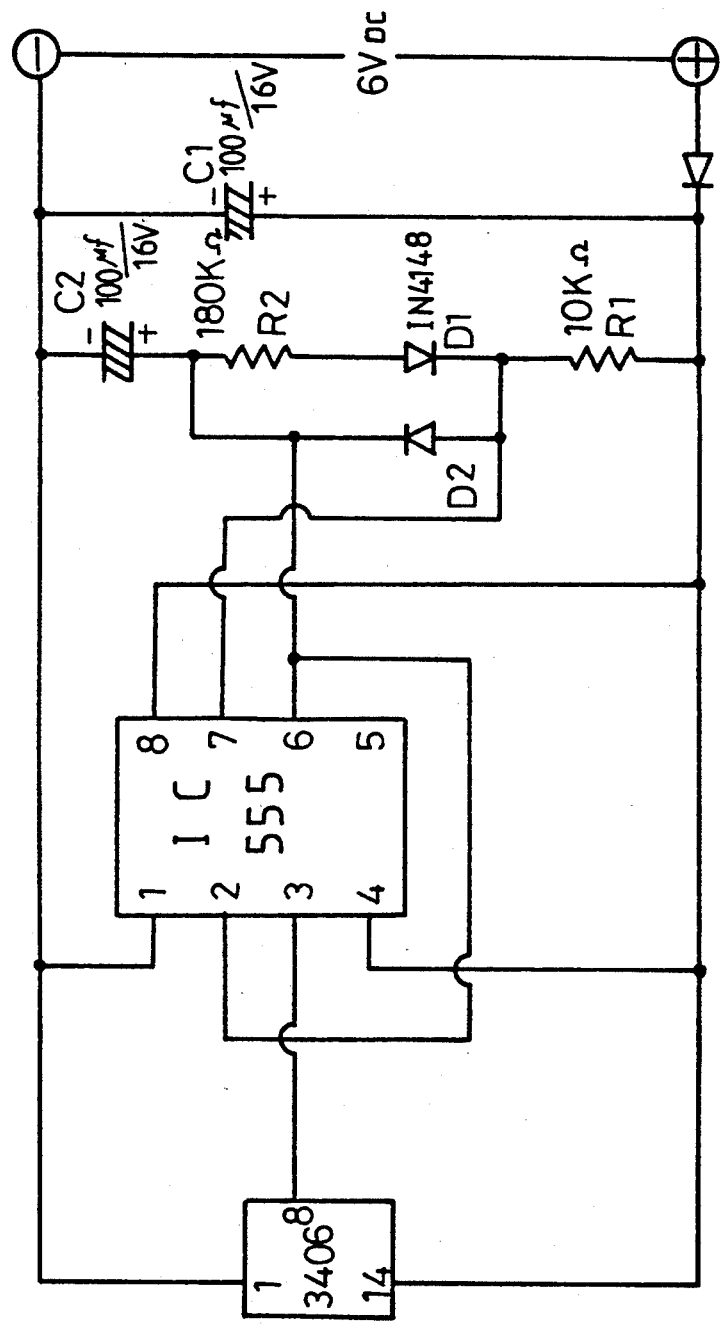
FIG. 5 is an audio frequency circuit according to the present invention.

FIG. 5 is an audio frequency circuit of the present invention, in which the power supply passes of "R" to charge Pin 7 of IC 555 in a cyclic and periodic manner; the charging and discharging coefficient are about in a ratio of 1:7. The power passes D2 to supply to Pin 6 of IC 555 to generate an oscillation, which is coupled with C2 to generate a charging-and-discharging cycle of 1-2 seconds. C2 charges Pin 7 through R2 and D1 to provide a triggering level. When a comparative level is reached, Pin 2 will make a reset. An output of driving voltage will be generated on Pin 3 to drive a buzzer 3406 to generate an audio vibration at a frequency ranging from 300 to 400 HZ on a main stem 10 so as to provide a chaser effect to moles.

Since the aforesaid circuit is a well-known skill which is not claimed in the claims, no details thereof are given.

I claim:

1. A mole chaser comprising:

a main stem being a hollow pipe with a point end at one end, and outer threads and a granular surface on the other end thereof;

a cap having two lugs on both sides thereof, and having inner threads;

a battery chamber, of which one end being furnished with slots;

an audio frequency circuit for generating an audio frequency vibration, and a circuit board for said circuit having two lugs; and a washer;

said lugs of said circuit board being mated and retained in said slots; said circuit board being inserted in said main stem before closed with said cap and said washer; to form a waterproof structure said point end of said main stem being planted in ground; and an audio frequency signal generated with said audio frequency circuit and being sent out through said main stem to chase moles away; and said battery chamber capable of being pulled out easily for replacing said battery therein.

* * * * *